United States Patent
Kim et al.

(10) Patent No.: US 11,032,476 B2
(45) Date of Patent: Jun. 8, 2021

(54) IMAGE SENSOR AND ELECTRONIC DEVICE COMPRISING THE SAME

(71) Applicant: SAMSUNG ELECTRONICS CO., LTD., Suwon-si (KR)

(72) Inventors: Yong Seong Kim, Suwon-si (KR); Da Hee Lee, Suwon-si (KR); Young Mi Jo, Hwaseong-si (KR); Dong Ki Min, Seoul (KR); Joon Hyuk Im, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/537,675

(22) Filed: Aug. 12, 2019

(65) Prior Publication Data

US 2020/0260008 A1 Aug. 13, 2020

(30) Foreign Application Priority Data

Feb. 12, 2019 (KR) .................... 10-2019-0016096

(51) Int. Cl.
*H04N 5/232* (2006.01)
*G06T 5/00* (2006.01)

(52) U.S. Cl.
CPC ......... *H04N 5/23258* (2013.01); *G06T 5/003* (2013.01); *H04N 5/23267* (2013.01); *G06T 2207/20201* (2013.01)

(58) Field of Classification Search
None
See application file for complete search history.

(56) References Cited

U.S. PATENT DOCUMENTS

| 8,289,438 | B2 | 10/2012 | Yeh |
| 8,520,082 | B2 | 8/2013 | Corcoran et al. |
| 8,559,751 | B2* | 10/2013 | Gobert ............... G06T 7/20 382/275 |
| 8,648,918 | B2* | 2/2014 | Kauker ............... G06T 5/003 348/208.6 |
| 9,189,835 | B2* | 11/2015 | Cho ............... G06T 5/003 |
| 9,467,623 | B2* | 10/2016 | Hyun ............... H04N 5/2328 |
| 9,762,801 | B1* | 9/2017 | Zhu ............... H04N 5/23254 |
| 9,832,382 | B2* | 11/2017 | Hasan ............... H04N 5/2353 |

(Continued)

FOREIGN PATENT DOCUMENTS

| JP | 2009-253936 | 10/2009 |
| KR | 10-2018-0015549 | 2/2018 |

OTHER PUBLICATIONS

Zhe Hu, et al., "Image Deblurring Using Smartphone Inertial Sensors," The IEEE Conference on Computer Vision and Pattern Recognition (CVPR), 2016, pp. 1855-1864.

*Primary Examiner* — James M Hannett
(74) *Attorney, Agent, or Firm* — F. Chau & Associates, LLC

(57) ABSTRACT

An image sensor includes a pixel array that includes a plurality of pixels, a first interface directly connected to an external gyro sensor and that receives gyro data output by the gyro sensor in response to motion, and a control logic that generates image data by exposing the plurality of pixels for a predetermined exposure period, generates valid data that correspond to the exposure period using the gyro data, and generates, based on the valid data, compensation information that represents a movement path of the motion.

19 Claims, 20 Drawing Sheets

(56) References Cited

U.S. PATENT DOCUMENTS

| | | |
|---|---|---|
| 10,542,217 B2* | 1/2020 | Yamada .............. H04N 5/23277 |
| 2003/0002746 A1* | 1/2003 | Kusaka .............. H04N 5/23248 |
| | | 382/255 |
| 2006/0017817 A1 | 1/2006 | Okubo |
| 2008/0100716 A1* | 5/2008 | Fu ...................... H04N 5/23248 |
| | | 348/208.8 |
| 2009/0027508 A1 | 1/2009 | Miki et al. |
| 2017/0104933 A1 | 4/2017 | Paik et al. |
| 2018/0041704 A1 | 2/2018 | Jo et al. |

* cited by examiner

IMAGE SENSOR AND ELECTRONIC DEVICE COMPRISING THE SAME

CROSS-REFERENCE TO RELATED APPLICATION(S)

This application claims priority under 35 USC § 119 from, and the benefit of, Korean Patent Application No 10-2019-0016096, filed on Feb. 12, 2019 in the Korean Intellectual Property Office, the contents of which are herein incorporated by reference in their entirety.

BACKGROUND

Embodiments of present inventive concept are directed to an image sensor and an electronic device comprising the same.

An image sensor is a semiconductor-based sensor that can receive light and generate an electrical signal from the received light, and typically includes a pixel array that includes a plurality of pixels, a logic circuit that drives the pixel array and generates an image, and so on. However, the image may not be captured accurately, due to motion, such as a user hand shake, occurring while the pixels are generating electric charges in response to external light. To correct such motion-related image degradations due to user movement, there have been suggested techniques, such as optical image stabilization (OIS), that prevent motion-related image degradation by moving lenses. However, the OIS technique requires an additional module for moving the lenses, and thus may have space and cost disadvantages for applications in limited form-factor environments.

SUMMARY

Embodiments of the present inventive concept can provide an image sensor that includes a gyro sensor and an image sensor directly connected to and synchronized with each other, which can effectively correct motion-related image degradations by using data output by the gyro sensor in response to motion; and an electronic device that includes the image sensor.

According to an embodiment of the present inventive concept, an image sensor includes a pixel array that includes a plurality of pixels; a first interface directly connected to an external gyro sensor and that receives gyro data output by the gyro sensor in response to motion; and a control logic that generates image data by exposing the plurality of pixels for a predetermined exposure period, generates valid data that correspond to the exposure period using the gyro data, and generates, based on the valid data, compensation information that represents a movement path of the motion.

According to an embodiment of the present inventive concept, an electronic device includes: a gyro sensor that detects a motion that has an arbitrary movement path and outputs sampling data at a predetermined sampling rate; an image sensor that includes a plurality of pixels and a control logic that generates image data based on pixel signals output by the plurality of pixels, wherein the control logic outputs compensation information that corresponds to the movement path of the motion based on the sampling data generated by the gyro sensor within an exposure period of the plurality of pixels; and a processor that generates a result image from the image data, based on the compensation information.

According to an embodiment of the present inventive concept, an image sensor includes: a pixel array that includes a plurality of pixels connected to a plurality of row lines and a plurality of column lines; a row driver that sequentially scans the respective row lines during a predetermined exposure period; a readout circuit connected to the plurality of column lines and that detects pixel voltages from the plurality of pixels; and a control logic that controls operation timings of the row driver and the readout circuit, integrate sampling data received from an external gyro sensor during the exposure period, and generates compensation information that represents a movement path of motion sensed by the gyro sensor.

DETAILED DESCRIPTION

Hereinafter, exemplary embodiments of the present inventive concept will be described with reference to the accompanying drawings.

Figure 1:
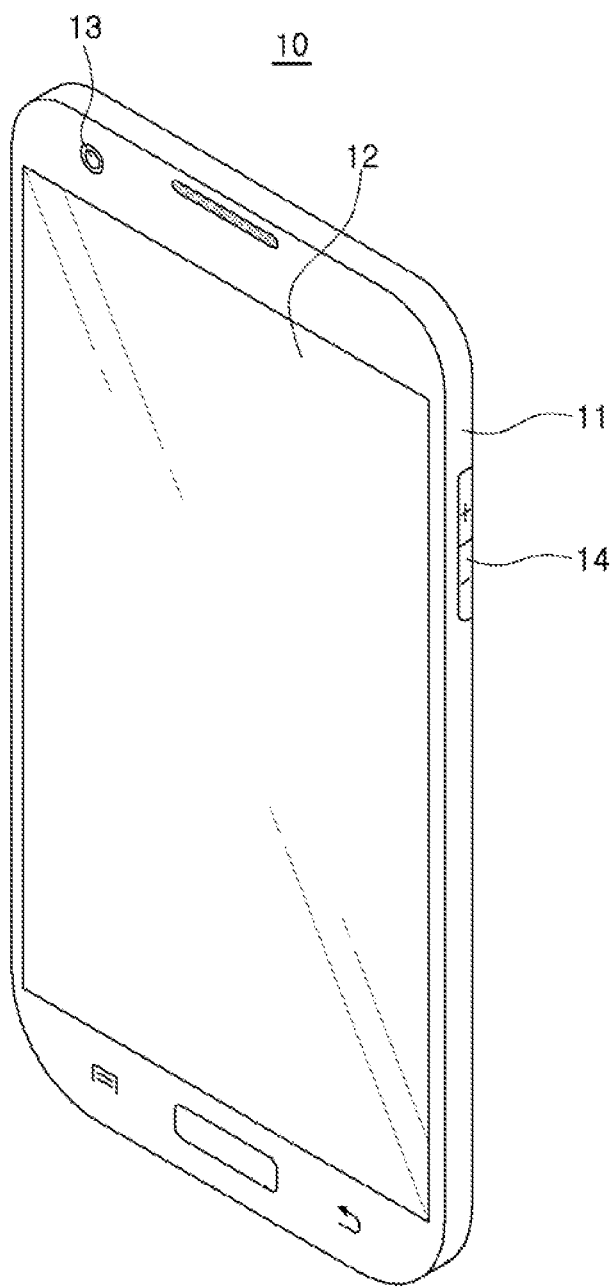
FIG. 1 and FIG. 2 illustrate an electronic device that includes an image sensor according to an exemplary embodiment of the present inventive concept.
Figure 2:
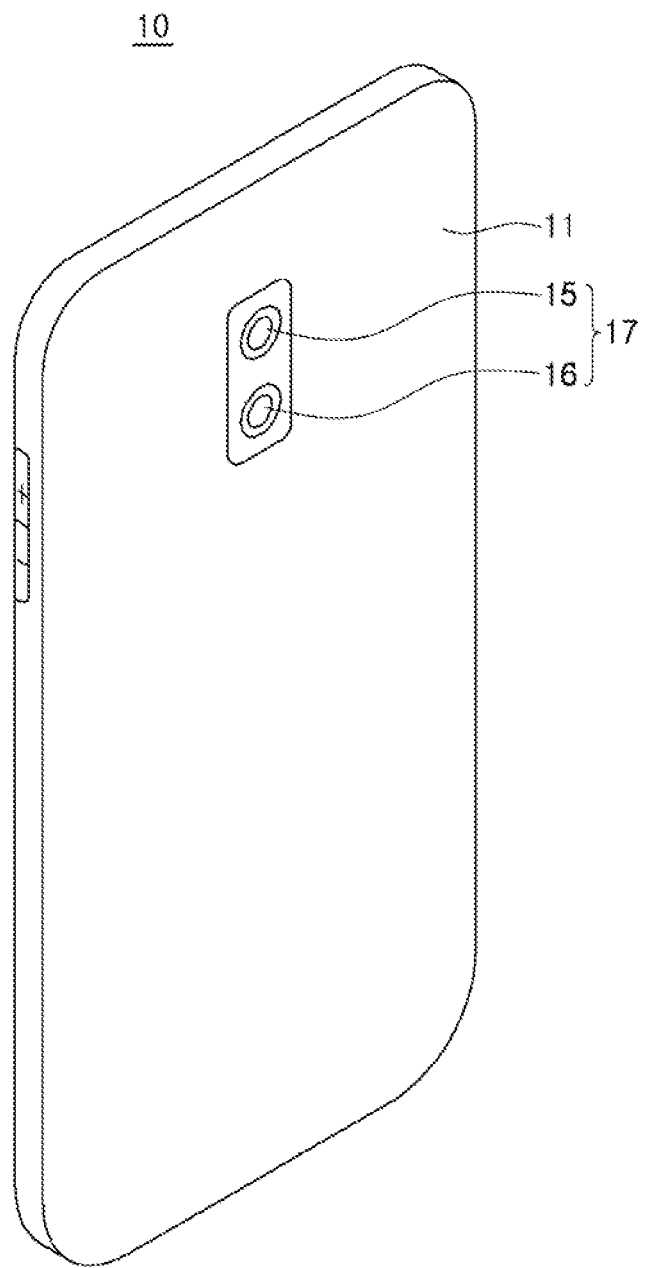

FIG. 1 and FIG. 2 illustrate an electronic device that includes an image sensor according to an exemplary embodiment.

Referring to FIG. 1 and FIG. 2, an electronic device 10 according to an exemplary embodiment includes a housing 11, a display 12, a front camera 13, an input unit 14 and a rear camera 17. The electronic device 10 according to an exemplary embodiment may be a smartphone as illustrated in FIG. 1, or may be any one of various other devices, such as a mobile device such as a tablet PC or a laptop computer, a wearable device such as a smartwatch, or a digital camera.

In one exemplary embodiment, the electronic device 10 includes a plurality of cameras 13 and 17. The rear camera 17 includes a first camera 15 and a second camera 16, and for example, the first camera 15 and the second camera 16 may have different angles of view, or different sized image sensors, etc., from each other. Although the front camera 13 is illustrated as a single camera in an exemplary embodiment illustrated in FIG. 1 and FIG. 2, the front camera 13 may include a plurality of cameras each having different characteristics, according to different exemplary embodiments.

When capturing an image using the electronic device 10 the electronic device 10 may be unintentionally moved due to user hand-shake, etc., and the movement of the electronic device 10 can lead to image degradation. For example, the movement of the electronic device 10 can cause the image to be blurry, devoid of sharp details.

In general, to prevent image degradation due to motion of the electronic device 10, an OIS module is provided that can move the lenses included in the cameras 13 and 17. However, an OIS module requires additional components that move the lenses, which can increase the cost of the electronic device 10 in addition to using the limited space in the electronic device 10.

In exemplary embodiments of the present inventive concept, a gyro sensor installed in the electronic device 10 can be used to correct image degradations caused by unintended user motion. The image sensor can be directly connected to the gyro sensor and synchronized with the gyro sensor. Further, the image sensor can receive gyro data output by the gyro sensor in response to a sensed motion, select valid data from the gyro data that corresponds to an exposure period, and generate compensation information that corrects image degradations caused by the motion. In one exemplary embodiment, the compensation information includes a point spread function.

Figure 3:
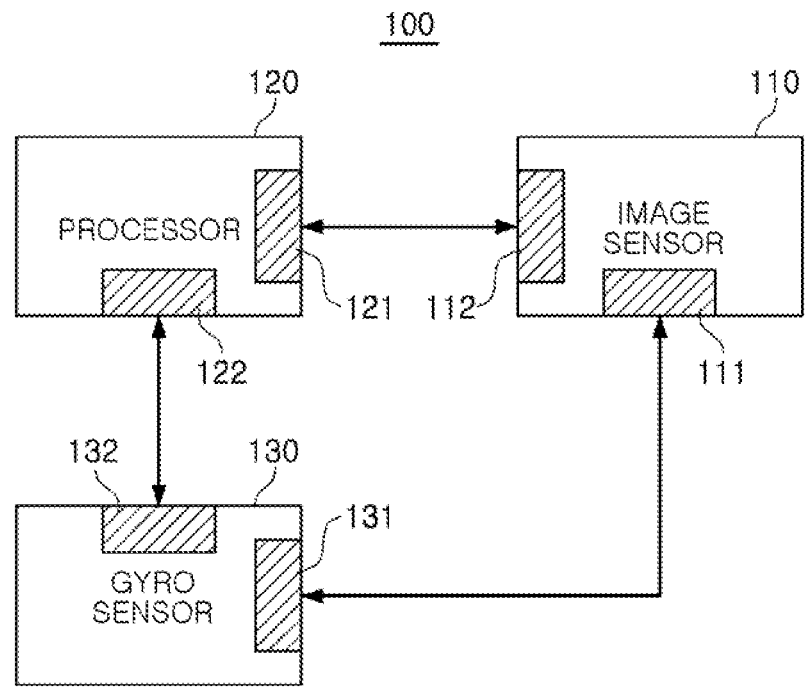
FIG. 3 and FIG. 4 are simplified block diagrams of an electronic device according to an exemplary embodiment of the present inventive concept.
Figure 4:
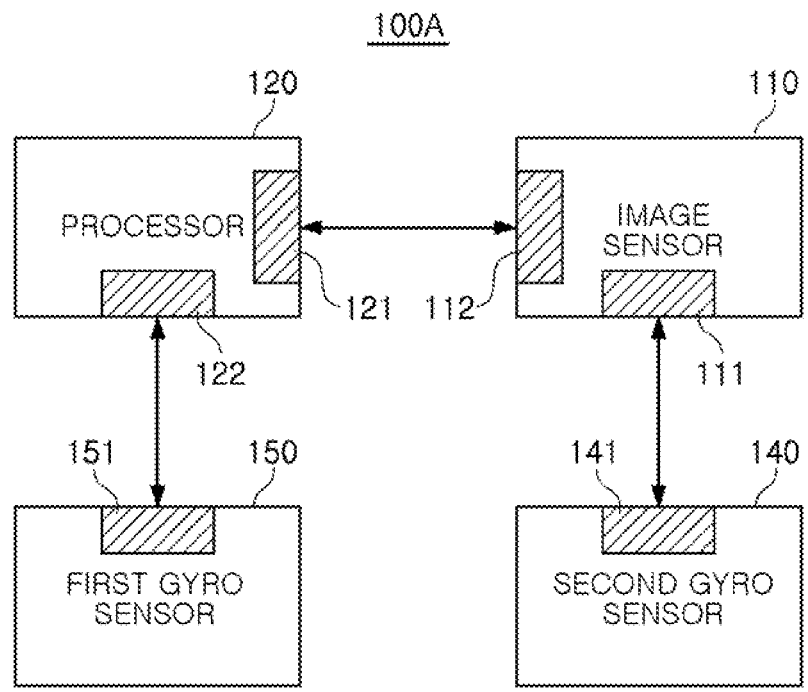

FIG. 3 and FIG. 4 are simplified block diagrams of an electronic device according to an exemplary embodiment of the present inventive concept.

According to an embodiment, referring to FIG. 3, an electronic device 100 includes an image sensor 110, a processor 120, a gyro sensor 130, etc. In particular, the processor 120 can control the overall operation of the electronic device 100, and includes at least one of a central processing unit (CPU), an application processor (AP), or a system-on-chip (SoC).

According to an embodiment, the image sensor 110, the processor 120, and the gyro sensor 130 include interfaces that can exchange data with one another. For example, the image sensor 110 includes a first interface 111 directly connected to the gyro sensor 130, and a second interface 112 directly connected to the processor 120. The image sensor 110, through the first interface 111, can exchange data directly with the gyro sensor 130 without going through the processor 120. Accordingly, gyro data generated by the gyro sensor 130 in response to sensed motion during an exposure period in which the image sensor 110 executes a shutter operation, can be synchronized with the image sensor 110 and transmitted to the image sensor 110.

For example, according to an embodiment, the first interface 111 of the image sensor 110 includes at least one of a serial peripheral interface (SPI) or an inter-integrated circuit (I2C) interface. The image sensor 110 and the gyro sensor 130 can be operated in a master-slave relationship. The second interface 112 of the image sensor 110 is connected to a first interface 121 of the processor 120 and includes a mobile industry processor interface (MIPI).

According to an embodiment the processor 120 includes the first interface 121 connected to the image sensor 110, a second interface 122 connected to the gyro sensor 130, etc. Similarly, the gyro sensor 130 includes a first interface 131 connected to the image sensor 110, and a second interface 132 connected to the processor 120.

Next, according to an embodiment, referring to FIG. 4, an electronic device 100A according to an exemplary embodiment includes an image sensor 110, a processor 120, a first gyro sensor 140, a second gyro sensor 150, etc. Unlike the electronic device 100 according to an exemplary embodiment illustrated in FIG. 3, the electronic device 100A according to an exemplary embodiment illustrated in FIG. 4 includes the first gyro sensor 140 connected to the image sensor 110 and the second gyro sensor 150 connected to the processor 120.

Similarly, according to an embodiment, as illustrated in the exemplary embodiment illustrated in FIG. 3, the image sensor 110 includes a first interface 111 directly connected to the first gyro sensor 140 and a second interface 112 directly connected to the processor 120. The image sensor 110, through the first interface 111, can directly receive data output 14 the first gyro sensor 140 without going through the processor 120. The image sensor 110 and the first gyro sensor 140 can be operated in synchronization with each other. The first interface 111 of the image sensor 110 includes at least one of a serial peripheral interface (SPI) or an inter-integrated circuit (I2C) interface, and the second interface 112 includes a mobile industry processor interface (MIPI).

In exemplary embodiments illustrated in FIG. 3 and FIG. 4, the processor 120 receives, along with image data, compensation information that can be used to correct blur, from the image sensor 110. For example, the processor 120 corrects blur in the image data by g to the compensation information, and generates a result image. Alternatively, by referring to the compensation information, the processor 120 can select from plurality of image data frames received from the image sensor 110 at least one image data frame that contains less motion as a result image.

Figure 5:
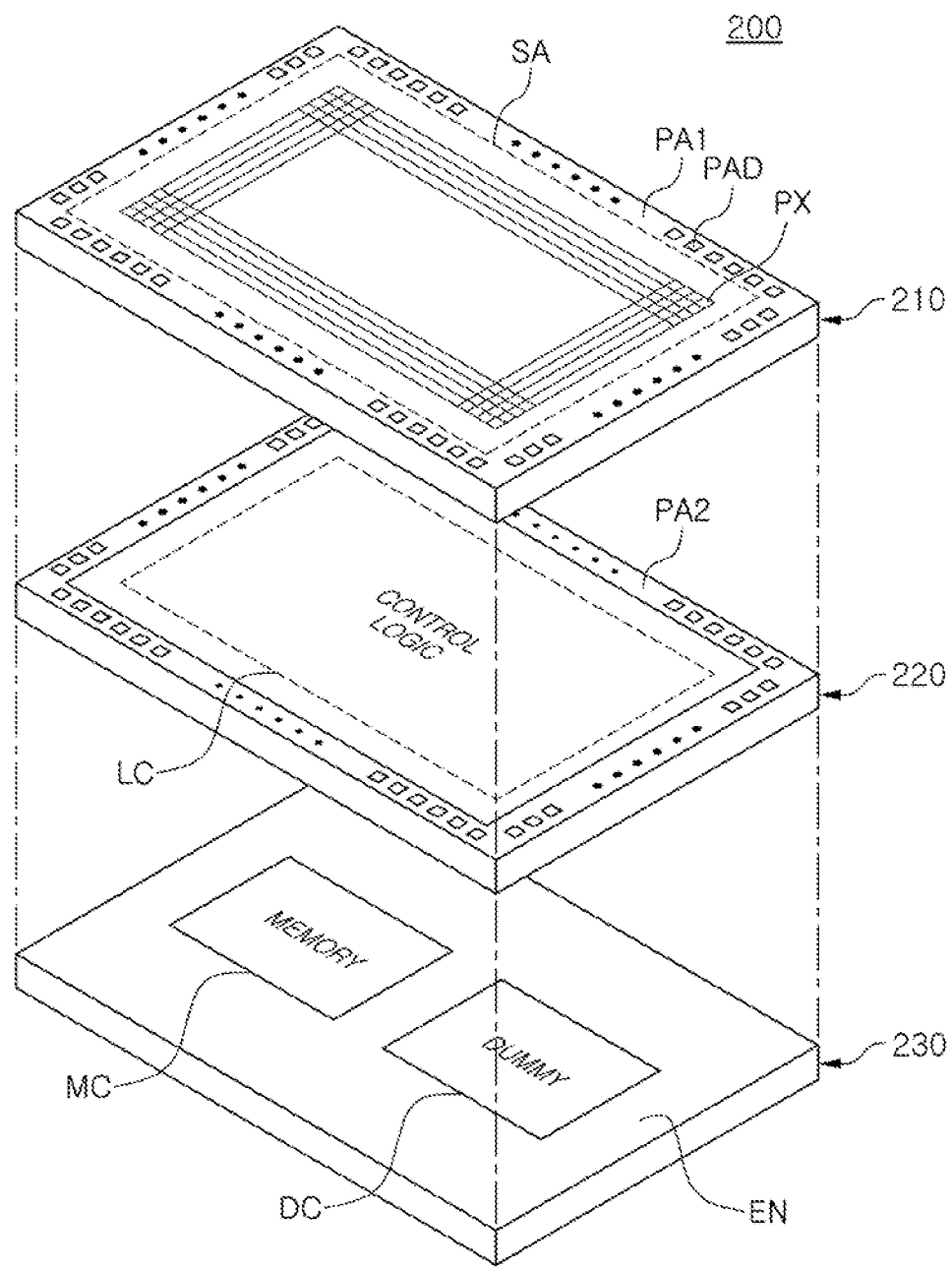
FIG. 5 and FIG. 6 are simplified diagrams of an image sensor according to an exemplary embodiment of the present inventive concept.
Figure 6:
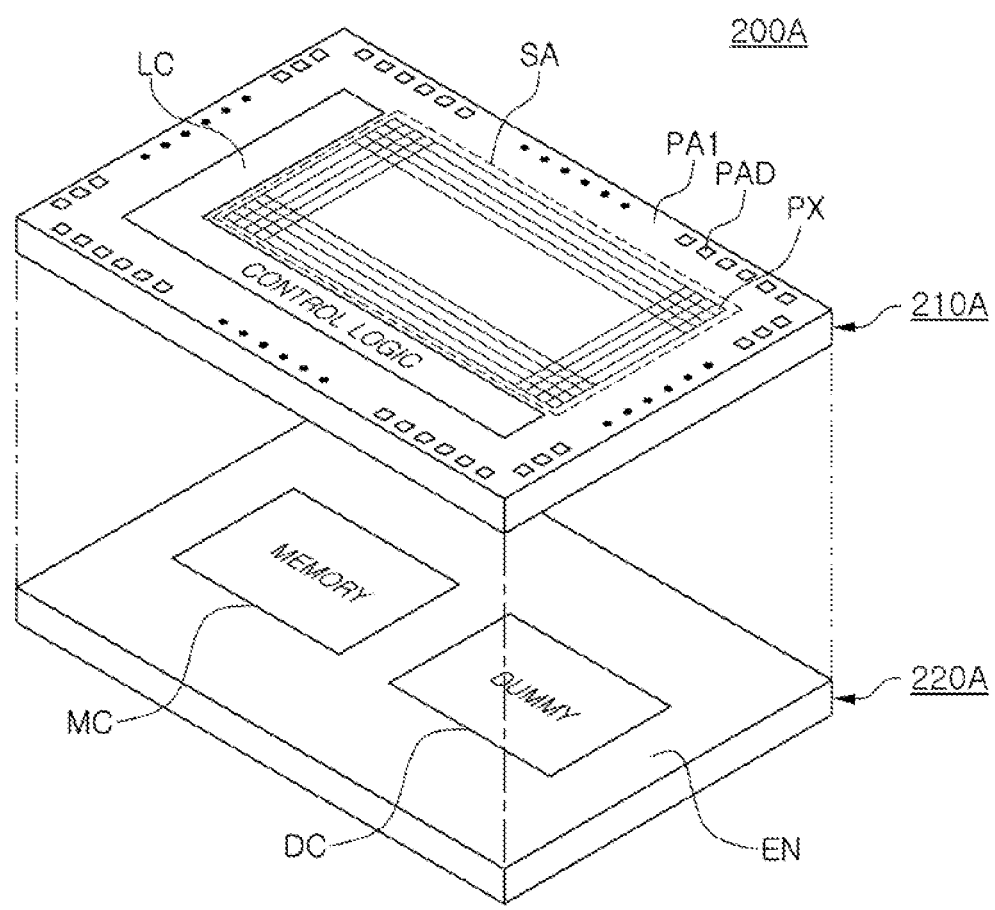

FIG. 5 and FIG. 6 are simplified diagrams of an image sensor according to an exemplary embodiment of the present inventive concept.

First, referring to FIG. 5, an image sensor 200 according to an exemplary embodiment includes a first layer 210, a second layer 220 disposed below the first layer 210, a third layer 230 disposed below the second layer 220, etc. The first layer 210, the second layer 220, and the third layer 230 are vertically stacked one on top of each other. In one exemplary embodiment, the first layer 210 and the second layer 220 are stacked one on top of the other at a wafer level, and the third layer 230 is attached to a lower side of the second layer 220 at a chip level. The first to third layers 210-230 can be provided as a single semiconductor package.

According to an embodiment, the first layer 210 includes a sensing area SA that includes a plurality of pixels PX, and a first pad area PA1 disposed around the sensing area SA. The first pad area PA1 includes a plurality of upper pads PAD, and the plurality of upper pads PAD are connected to pads disposed in a second pad area PA2 and a control logic LC of the second layer 220 through vias, etc.

According to an embodiment, the pixels PX each include a photodiode that receives light and generates an electric charge therefrom, a pixel circuit that processes the electric charge generated by the photodiode, etc. The pixel circuit includes a plurality of transistors that generate a voltage that corresponds to the electric charge generated by the photodiode.

According to an embodiment, the second layer 220 includes a plurality of devices, such as control logic LC. The devices included in the control logic LC include circuits that drive the pixel circuit disposed on the first layer 210, and such circuits include a row driver, a column driver, a timing controller, etc. The devices included in the control, logic LC are connected to the pixel circuit through the first and second pad areas PA1 and PA2. The control logic LC can obtain reset voltages and pixel voltages from the plurality of pixels PX and generate pixel signals therefrom.

According to an exemplary embodiment, at least one pixel of the plurality of pixels PX includes a plurality of photodiodes disposed at the same level. Pixel signals generated from electric charges of the plurality of photodiodes have different phases from each another, and the control logic LC provides an auto-focus function based on such pixel signal phase differences.

According to an embodiment, the third layer 230 disposed below the second layer 220 includes a memory chip MC, a dummy chip DC, and an encapsulating layer EN that encapsulates the memory chip MC and the dummy chip DC. The memory chip MC may be a dynamic random access memory (DRAM) or a static random access memory (SRAM), and the dummy chip DC does not have an actual data storage function. The memory chip MC is electrically connected, through a bump, to at least some of the devices included in the control logic LC of the second layer 220, and stores information used for providing an auto-focus function. In one exemplary embodiment, the bump is a microbump.

Next, according to an embodiment, referring to FIG. 6, an image sensor 200A according to an exemplary embodiment includes a first layer 210A and a second layer 220A. The first layer 210A includes a sensing area SA that includes a plurality of pixels PX, control logic LC that include devices that drive the plurality of pixels PX, and a first pad area PA1 disposed around the sensing area SA and the control logic LC. The first pad area PA1 includes a plurality of upper pads PAD, and the plurality of upper pads PAD are connected to a memory chip MC disposed on the second layer 220A through vias, etc. The second layer 220A includes a memory chip MC, a dummy chip DC, and an encapsulating layer EN that encapsulates the memory chip MC and the dummy chip DC.

Figure 7:
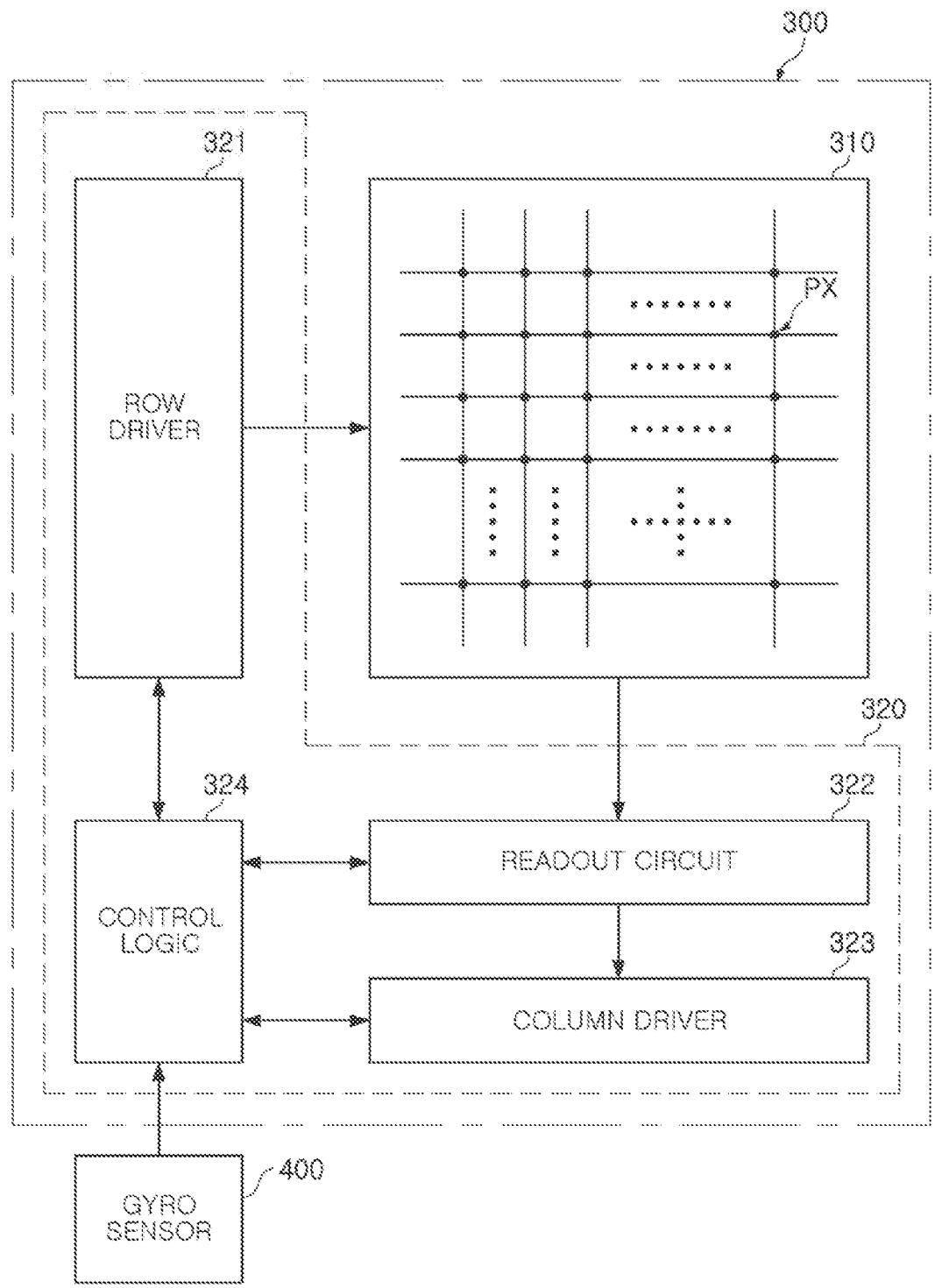
FIG. 7 is a simplified block diagram of an image sensor according to an exemplary embodiment of the present inventive concept.

FIG. 7 is a simplified block diagram of an image sensor according to an exemplary embodiment of the present inventive concept.

Referring to FIG. 7, according to an embodiment, an image sensor 300 according to an exemplary embodiment includes a pixel array 310 and a controller 320, and the controller 320 includes a row driver 321, a readout circuit 322, a column driver 323, a control logic 324, etc.

According to an embodiment, image sensor 300 generates image data by converting externally received light into electrical signals. The pixel array 310 included in the image sensor 300 includes a plurality of pixels PX, and each of the plurality of pixels PX includes a photoelectric device that receives light and generates an electric charge therefrom, such as a photodiode. In one exemplary embodiment, each of the plurality of pixels PX includes two or more photodiodes. Each of the plurality of pixels PX may generate a pixel signal that corresponds to light of various colors, or two or more photodiodes may be included in each of the plurality of pixels PX to provide an autofocusing function.

According to an embodiment, each of the plurality of pixels PX includes a pixel circuit that generates pixel signals from electric charges generated by the photodiodes. In one exemplary embodiment, the pixel circuit includes a transmission transistor, a driving transistor, a select transistor, a reset transistor, etc. The pixel circuits can detect, from the respective pixels PX, reset voltages and pixel voltages and obtain pixel signals by calculating differences therebetween. The pixel voltages reflect the electric charges generated by the photodiodes included in the respective pixels PX. In one exemplary embodiment, two or more pixels adjacent to each other may form one pixel group, and two or more pixels PX included in such a pixel group share in common at least a portion of a transmission transistor, a driving transistor, a select transistor, and a reset transistor.

According to an embodiment, the row driver 321 drives the pixel array 310 on a row-by-row basis. For example, the row driver 321 generates a transmission control signal that controls the transmission transistor of the pixel circuit, a reset control signal that controls the reset transistor of the pixel circuit, a select control signal that controls the select transistor of the pixel circuit, etc.

According to an embodiment, the readout circuit 322 includes a sampling circuit, an analog-to-digital converter (ADC), etc. The sampling circuit includes a plurality of samplers, and in one exemplary embodiment, the samplers are correlated double samplers (CDS). The samplers are connected through column lines and pixels PX in a row line selected by the row driver 321, and can detect reset voltages and pixel voltages from the corresponding pixels PX. The samplers compare the reset voltages and the pixel voltages, respectively, to a ramp voltage, and generate the results thereof. The ADC converts the comparison results generated by the samplers into digital signals and output the same.

According to an embodiment, the column driver 323 includes, for example, a latch or a buffer circuit that can temporarily store digital signals, and an amplifier circuit, and processes digital signals received from the readout circuit 322. The row driver 321, the readout circuit 322, and the column driver 323 are controlled by the control logic 324. The control logic 324 includes a timing controller that controls operation timings of the row driver 321, the readout circuit 322, and the column driver 323, an image signal processor that processes image data, a circuit that processes data received from a gyro sensor 400, etc.

According to an embodiment, the control logic 324 obtains, from an external gyro sensor 400, gyro data generated in response to motion sensed by the gyro sensor 400. For example, the control logic 324 includes an interface directly connected to the gyro sensor 400. From the gyro data received through the interface, the control logic 324 can determine valid data that corresponds to an exposure period of the pixels PX. To accurately determine the valid data, the control logic 324 is operated as a master device with respect to the gyro sensor 400, and is synchronized with the gyro sensor 400.

According to an embodiment, the control logic 324 can, by using the valid data, generate compensation information that corrects blur in image data caused by motion sensed by the gyro sensor 400. In one exemplary embodiment, the control logic 324 generates the compensation information as a point spread function, records the compensation information in a footer region of the image data, and outputs the image data. For example, the compensation information is used by a processor that has received image data to generate a result image by correcting blur in the image data, or by selecting an image data frame from a plurality of image data frames that has relatively less motion as a result image.

Figure 8:
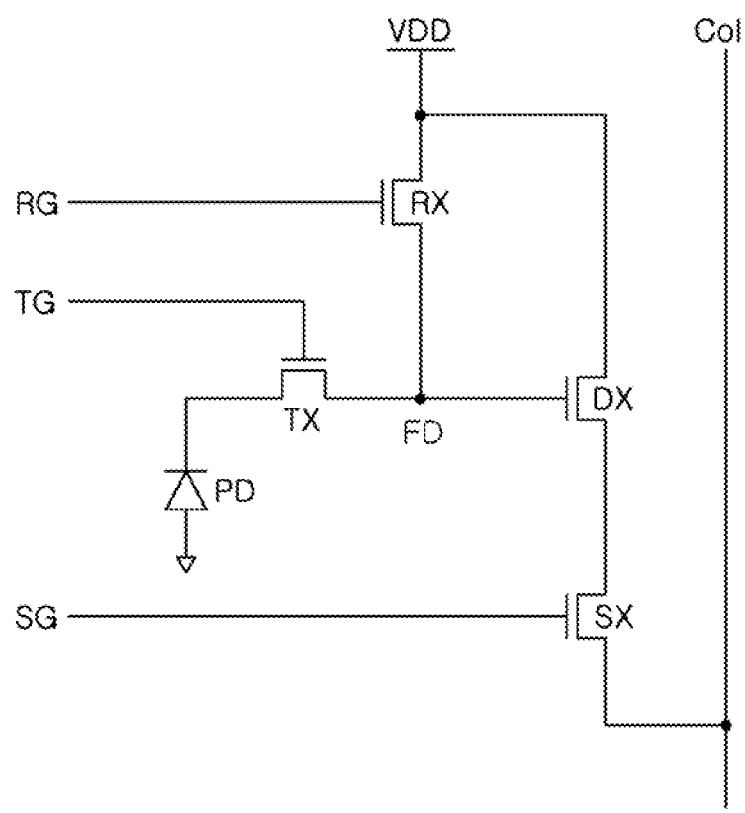
FIG. 8 is a circuit diagram of a pixel circuit for an image sensor according to an exemplary embodiment of the present inventive concept.

FIG. 8 is a simplified, circuit diagram illustrating a pixel of an image sensor according to an exemplary embodiment of the present inventive concept.

Referring to FIG. 8, according to an embodiment, a pixel included in the image sensor includes a photodiode PD that generates an electric charge in response to light, a pixel circuit that processes the electric charge generated by the photodiode PD and generates an electrical signal therefrom, etc. For example, the pixel circuit includes a reset transistor RX, a driving transistor DX, a select transistor SX, a transmission transistor TX, etc.

According to an embodiment, the reset transistor RX is turned on or turned off by a reset control signal RG, and when the reset transistor RX is turned on, a floating diffusion region voltage is reset to a power source voltage VDD. When the floating diffusion region voltage is reset, the select transistor SX is turned on by a select control signal SG to output a reset voltage to a column line Col.

In one exemplary embodiment, the photodiode PD generates an electron or a hole as a main charge carrier in response to light. Once the transmission transistor TX is turned on by a transfer control signal TG after the reset voltage is output to the column line Col, an electric charge generated by the photodiode PD upon exposure to light migrates to the floating diffusion region. The driving transistor DX is operated as a source follower amplifier that amplifies the voltage of the floating diffusion region, and once the select transistor SX is turned on by a select control signal SG, a pixel voltage that corresponds to the electric charge is generated by the photodiode PD and is output to the column line Col.

Figure 9:
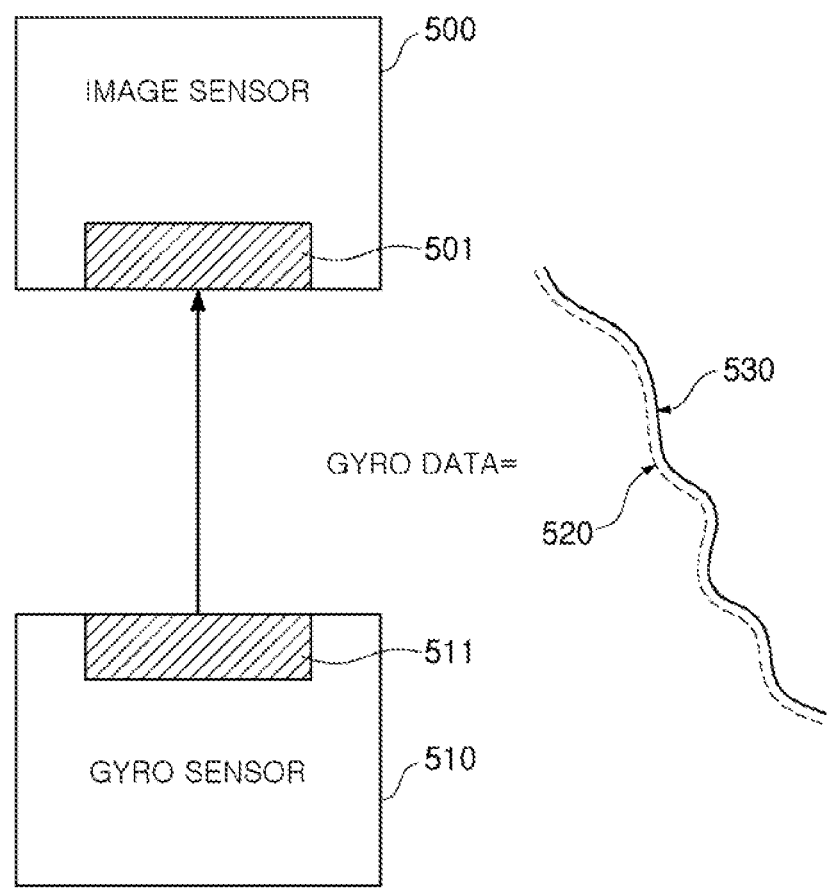
FIG. 9 to FIG. 11 illustrate operations of an image sensor according to an exemplary embodiment of the present inventive concept.
Figure 10:
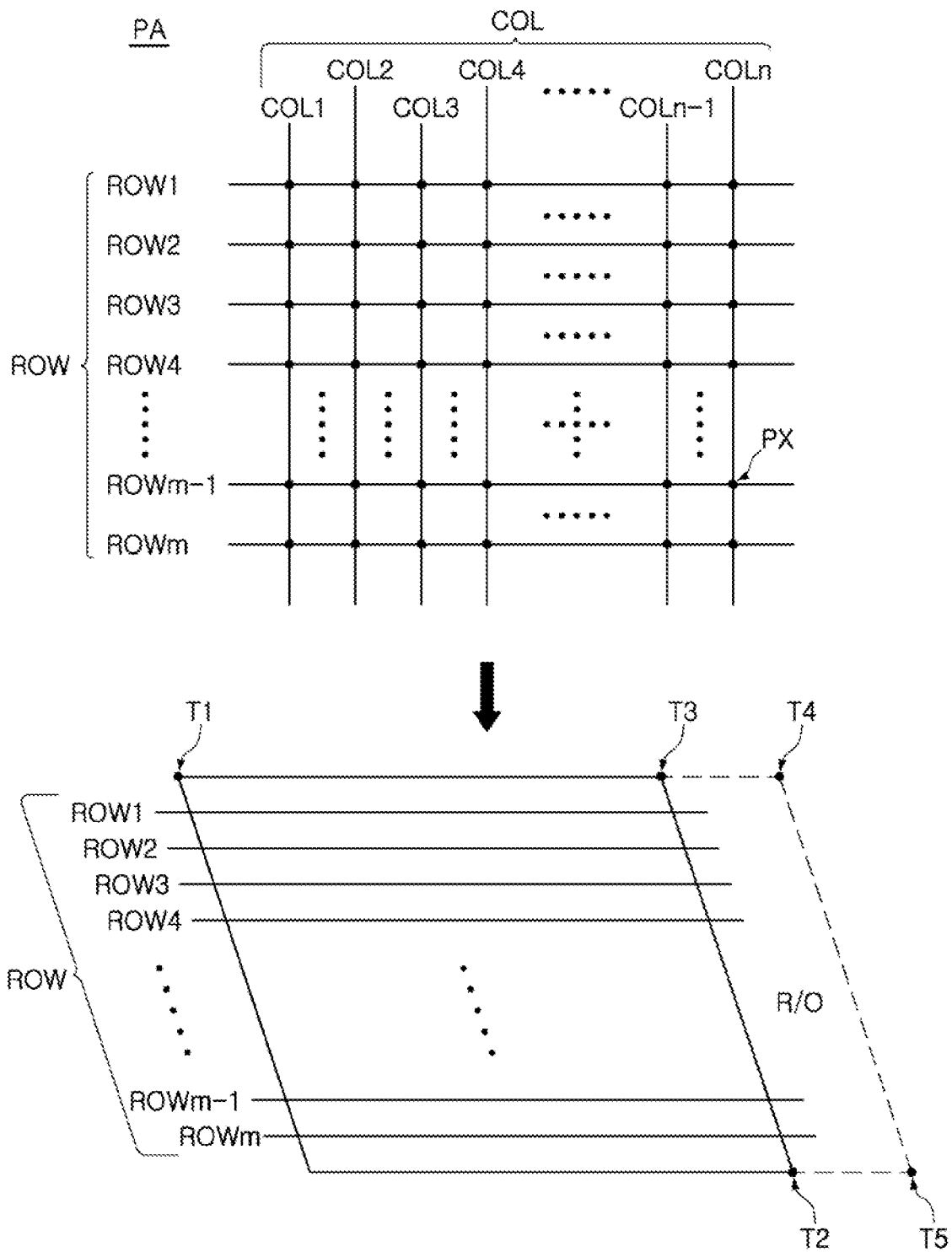
Figure 11:
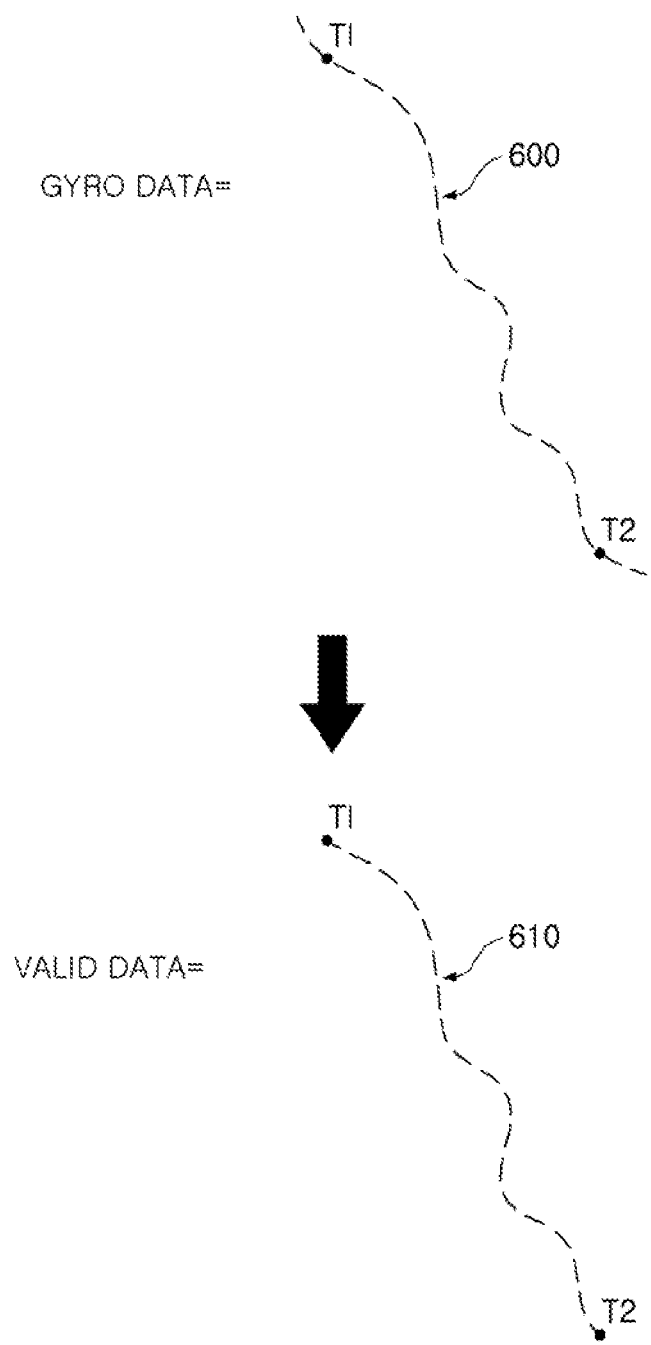

FIG. 9 to FIG. 11 illustrate operations of an image sensor according to an exemplary embodiment of the present inventive concept.

First, referring to FIG. 9, an image sensor 500 according to an exemplary embodiment is directly connected to a gyro sensor 510. The image sensor 500 includes a first interface 501 directly connected to an interface 511 of the gyro sensor 510, and obtains gyro data 520 from the gyro sensor 510. For example, the gyro data 520 is data that the gyro sensor 510 generates by sensing motion of an electronic device in which the image sensor 500 and the gyro sensor 510 are installed. The gyro data 520 represents a movement path along which the electronic device moves.

In one exemplary embodiment, the gyro data 520 generated by the gyro sensor 510 corresponds to a movement path 530 of the electronic device that was sampled at a predetermined sampling rate, and the gyro data 520 contains a plurality of sampling data generated at the sampling rate. The unit of the gyro data 520 may be identical to a unit of angular speed, such as deg/sec. As illustrated in FIG. 9, the image sensor 500 can predict the movement path 530 of the electronic device by integrating the gyro data 520 over time.

In one exemplary embodiment, the sampling rate of the gyro sensor 510 is greater than a frame rate of the image sensor 500. Accordingly, while the image sensor 500 is performing a shutter operation that generates image data, such as a single image frame, the image sensor 500 can receive the gyro data 520 that contains a plurality of sampling data from the gyro sensor 510.

According to an embodiment, the image sensor 500 can select, from the plurality of sampling data in the gyro data 520, sampling data that corresponds to an exposure period of the image sensor 500 and generate valid data. If the image sensor 500 and the gyro sensor 510 are not synchronized with each other, the image sensor 500 will be unable to accurately select sampling data that corresponds to the exposure period. For example, if the gyro sensor 510 and the image sensor 500 communicate through an additional processor without being directly connected to each other, the image sensor 500 and the gyro sensor 510 are not synchronized with each other, and thus can not accurately select sampling data that corresponds to the exposure period of the image sensor 500.

In one exemplary embodiment of the present inventive concept, the aforementioned issue can be addressed by connecting the image sensor 500 and the gyro sensor 510 directly to each other and thereby synchronizing the image sensor 500 and the gyro sensor 510 with each other. In addition, as will be described in greater detail below with reference to FIG. 10 and FIG. 11, timestamps that represent an exposure period of the image sensor 500 can be compared to timestamps that represent generation times of a plurality of sampling data generated by the gyro sensor 510 to accurately select sampling data that corresponds to the exposure period.

Referring to FIG. 10, a pixel array PA of an image sensor according to an exemplary embodiment includes a plurality of pixels PX. The plurality of pixels PX are connected to a plurality of row lines ROW1-ROWm: ROW and a plurality of column lines COL1-COLn: COL. The image sensor can scan the plurality of pixels PX along the plurality of row lines ROW. For example, the amount of time required to scan a single row line of the plurality of row lines ROW can be defined as a horizontal period, and the image sensor can be operated by a rolling shutter technique in which the plurality of pixels PX are scanned along the plurality of row lines ROW.

Continuing with FIG. 10, according to an embodiment, a start time point of a scan period for a first row line ROW1 can be defined as time point T1, and an end time point of a scan period for a last row line ROWm can be defined as time point T2. The time point T1 and the time point T2 correspond to a start time point and an end time point of an exposure period of the image sensor, respectively. in addition, a start time point of a readout operation R/O that reads out pixel signals from pixels PX connected to the first row line ROW1 can be defined as time point T3, and an end time point of the readout operation R/O can be defined as time point T4. Further, an end time point of a readout operation R/O that reads out pixel signals from pixels connected to the last row line ROWm can be defined as time point T5.

According to an embodiment, the exposure period can be defined as a time period from the time point T1 to the time point T2. Referring to FIG. 11, from sampling data contained in gyro data 600 obtained from the gyro sensor, the image sensor selects sampling data between the time point T1 and the time point T2 as valid data and generates compensation information 610. For example, the image sensor determines the valid data by comparing the timestamp of each sampling data contained in the gyro data 600 to a timestamp of the time point T1 and a timestamp of the time point T2.

According to an embodiment, the image sensor integrates the valid data to obtain the compensation information 610 that corresponds to a movement path sensed by the gyro sensor. According to exemplary embodiments, the image sensor may continuously integrate the sampling data in the valid data between the time point T1 and the time point T2, or may divide the time period between the time point T1 and the time point T2 into a plurality of time intervals and integrate sampling data in the respective time intervals.

Hereinbelow, further descriptions will be provided with reference to FIG. 12 to FIG. 14.

Figure 12:
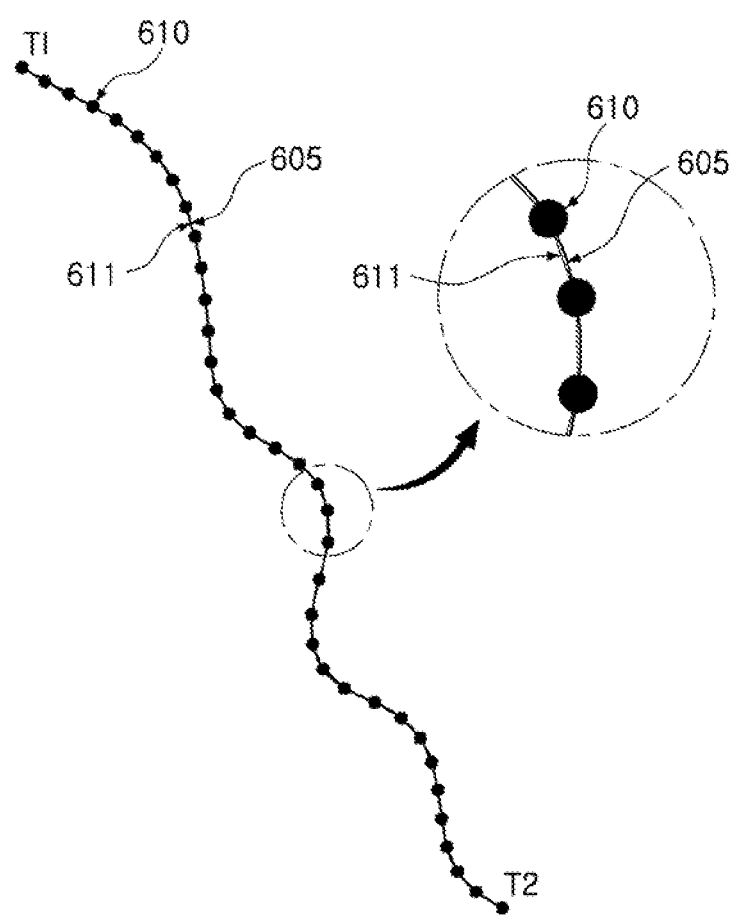
FIG. 12 to FIG. 14 illustrate operations of an image sensor according to an exemplary embodiment of the present inventive concept.
Figure 13:
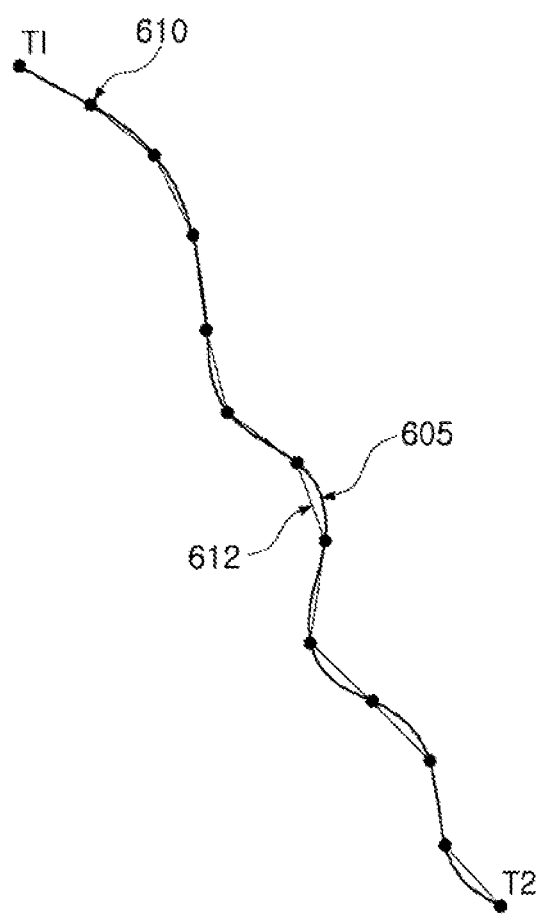
Figure 14:
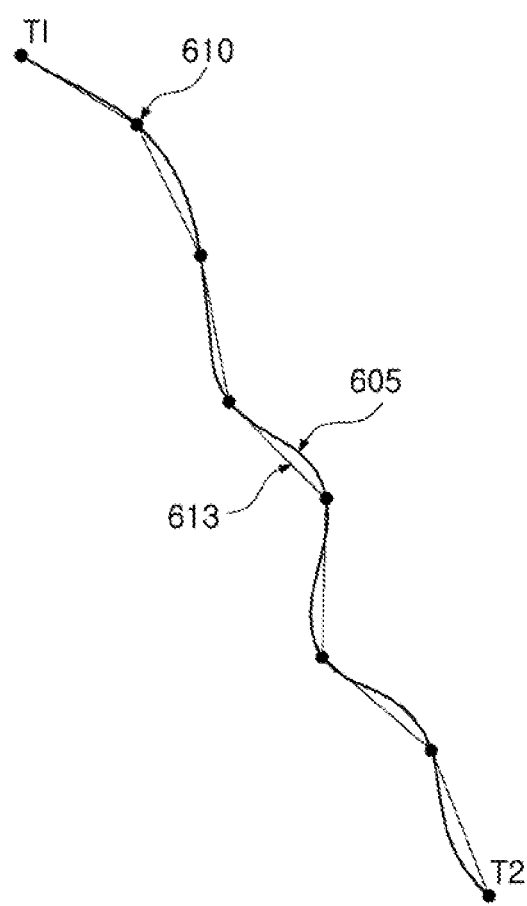

FIG. 12 to FIG. 14 illustrate operations of an image sensor according to an exemplary embodiment of the present inventive concept.

First, according to an embodiment, referring to FIG. 12, the image sensor obtains compensation information 610 that corresponds to a movement path along which the electronic device has moved by integrating valid data of the sampling data between the time point T1 and the time point T2. For example, the valid data can contain angular speed (deg/sec.) information, and the compensation information 610 may be expressed as a point spread function, where the point spread function represents the movement path of the motion.

In an exemplary embodiment illustrated in FIG. 12, the image sensor integrates the sampling data in the valid data at a sampling rate. Accordingly, as illustrated in FIG. 12, movement path information 611 represented by the compensation information 610 and a movement path 605 that corresponds to an actual motion of the electronic device are substantially identical to each other with no substantial differences therebetween.

Next, according to an embodiment, referring to FIG. 13, the image sensor selects valid data from sampling data between the time point T1 and the time point T2, and integrates the valid data to generate compensation information 610. In an exemplary embodiment illustrated in FIG. 13 unlike the exemplary embodiment illustrated in FIG. 12 the time period between the time point T1 and the time point T2 may be divided into a plurality of time intervals before integrating the valid data. Thus, as illustrated in FIG. 13, path information 612 represented by the compensation information 610 can be noticeably different from a movement path 605 that represents an actual motion of the electronic device. However, since not all sampling data contained in the valid data are continuously integrated, the compensation information 610 can be obtained with a relatively low computational load.

In an exemplary embodiment illustrated in FIG. 14, similar to an exemplary embodiment illustrated in FIG. 13, the image sensor divides a time period between the time point T1 and the time point T2 into a plurality of time intervals before integrating the valid data. However, in FIG. 14 the lengths of the respective time intervals are slightly longer than those of an exemplary embodiment illustrated in FIG. 13. Accordingly, a computational load on the image sensor can be reduced, but differences between path information 613 represented by compensation information 610 and a movement path 605 that represents an actual motion of the electronic device increases.

In exemplary embodiments illustrated in FIG. 13 and FIG. 14, the lengths of the respective time intervals that divide the time period between the time point T1 and the time point T2 can be variously modified. The lengths of the respective time intervals can be modified from an initially-set default value by the user of an electronic device in which the image sensor is installed. For example, the electronic device provides the user with an application that can adjust a degree of de-blur processing that removes from an image blur caused by the motion of the electronic device. As the user adjusts the degree of de-blur processing through the application, the lengths of the respective time intervals that divide the time period between the time point T1 and the time point T2 change.

Figure 15:
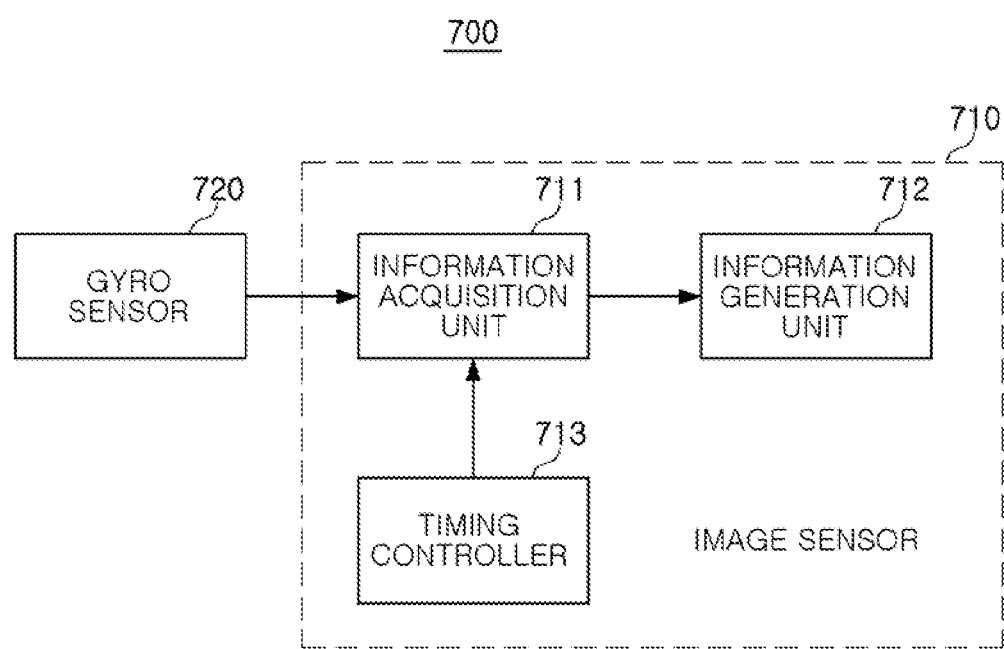
FIG. 15 is a block diagram that illustrates the operation of an image sensor according to an exemplary embodiment of the present inventive concept.

FIG. 15 is a block diagram that illustrates operations of an image sensor according to an exemplary embodiment of the present inventive concept.

Referring to FIG. 15, an electronic device 700 according to an exemplary embodiment includes an image sensor 710, a gyro sensor 720 connected to the image sensor 710 to directly exchange data with the image sensor 710, etc. The image sensor 710 includes an information acquisition unit 711, an information generation unit 712, a timing controller 713, etc.

According to an embodiment, the information acquisition unit 711 acquires through a predetermined interface gyro data generated by the gyro sensor 720. For example, the information acquisition unit 711 is connected to the gyro sensor 720 through an SPI or an I2C interface, etc., and receives, as the gyro data, sampling data generated and output by the gyro sensor 720 at a predetermined sampling rate.

According to an embodiment, the information generation unit 712 generates compensation information by using at least a portion of the sampling data from the gyro data received by the information acquisition unit 711. The compensation information is used to correct degradation in image data caused by motion of an electronic device in which the image sensor 710 and the gyro sensor 720 are installed, and is expressed as a point spread function, etc., that represents the movement path of the motion According to an embodiment, the timing controller 713 controls an overall operation timing of the image sensor 710, and, for example, controls the operation timings of a row driver that scans a pixel array, a readout circuit that reads out pixel signals from pixels scanned by the row driver, etc. In one exemplary embodiment, based on timing information received from the timing controller 713, the information acquisition unit 711 selects a portion of the sampling data contained in the gyro data and transmits the same to the information generation unit 712. For example, the timing controller 713 transmits to the information acquisition unit 711 the timing information that represents a start time point and an end time point of an exposure period. The information acquisition unit 711 selects, as valid data, sampling data between the start time point and, the end time point, and transmits the selected valid data to the information generation unit 712.

According to an embodiment, the information generation unit 712 generates compensation information by using the valid data received from the information acquisition unit 711. In one exemplary embodiment, the information generation unit 712 generates the compensation information by integrating the sampling data contained in the valid data. The information generation unit 712 may continuously integrate the sampling data contained in the valid data, or may divide the valid data into predetermined time intervals and then integrate the sampling data contained in the valid data.

Figure 16:
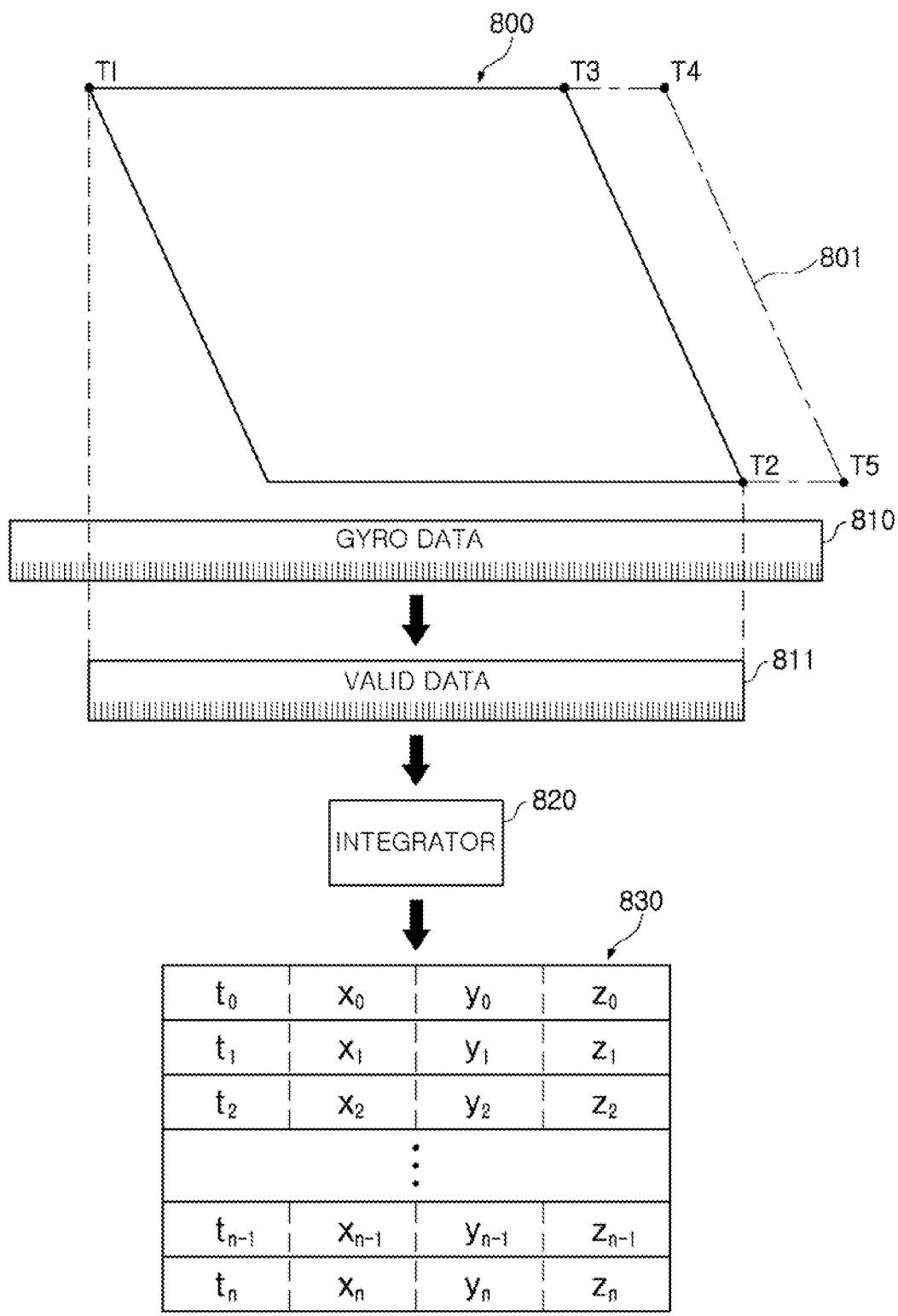
FIG. 16 illustrates the operation of an image sensor according to an exemplary embodiment of the present inventive concept.

FIG. 16 illustrates operations of an image sensor according to an exemplary embodiment of the present inventive concept.

Referring to FIG. 16, according to an embodiment, a control logic of the image sensor obtains image data from a pixel array during a readout operation time 801 and an exposure period 800 during which a shutter operation is executed. A start time point of the exposure period 800 is defined as time point T1, and an end time point of the exposure period 800 is defined as time point 12. Further, an end time point of a scan period for pixels connected to a first row line is defined as time point T3. Furthermore, an end time point of a readout operation for pixels connected to the first row line is defined as time point 14, and an end time point of a readout operation for pixels connected to a last row line is defined as time point T5.

According to an embodiment, gyro data 810 is generated by the gyro sensor by sensing motion of the electronic device and contains a plurality of sampling data generated at a sampling rate of the gyro sensor. Each of the plurality of sampling data contains its own generation time data along with motion data in units of angular speed. For example, the generation time data can be a timestamp.

According to an embodiment, the image sensor determines sampling data received between the start time point T1 of the exposure period 800 and the end time point T2 of the exposure, period 800 as valid data 811. For accurate determination of the valid data 811, the image sensor is operated in synchronization with the gyro sensor generating the gyro data 810.

According to an embodiment, the image sensor generates compensation information 830 by using the valid data 811. For example, the image sensor generates the compensation information 830 by integrating the sampling data contained in the valid data 811 using an integrator 820. The image sensor can integrate in real time sampling data being received after time point. T1 and stops the integration once time point T2 is reached. Accordingly, the image sensor can perform the integration during the exposure period and does not require an additional computation time to generate the compensation information 830.

According to an embodiment, the image sensor can continuously integrate the sampling data in the valid data 811 within the exposure period between time point T1 and time point T2. Alternatively, the image sensor can divide the exposure period between time point T1 and time point T2 into a plurality of time intervals and then integrate the sampling data in the valid data 811 over the respective time intervals.

In an exemplary embodiment illustrated in FIG. 16, the image sensor can divide the time period between time point T1 and time point T2 into a plurality of time intervals and integrate sampling data in the valid data 811 over the respective time intervals. Accordingly, the compensation information 830 includes time points t0-tn that define the time intervals and includes motion information items obtained by integrating the sampling data contained in the respective time intervals. The motion information items that correspond to the respective time intervals include values that represent the coordinates of points on a motion path sensed by the gyro sensor. In one exemplary embodiment, coordinates that correspond to time points t1-tn, except at start time point t0 of a first time interval, are not values of the absolute coordinates at corresponding time points on the motion path, but represent relative coordinates that correspond to a difference with respect to the coordinates of an immediately preceding time point. Accordingly, motion information items can have a negative sign, depending on the direction of the motion path sensed by the gyro sensor.

In one exemplary embodiment, the compensation information 830 has values corresponding to a plurality of axes. Referring to FIG. 16, the compensation information 830 includes values that correspond to a first axis (axis X), a second axis (axis Y), and a third axis (axis Z), respectively, and the horizontal axis and the vertical axis of an image generated by the image sensor correspond to the first axis, and the second axis, respectively. The third axis can be a rotational motion component about a center point of the image. In one exemplary embodiment, in addition to simple translational motions in a first axial direction and a second axial direction, motions due to a rotational movement that are sensed by the electronic device are taken into account in generating the compensation information, and thus, blur present in an image can be effectively corrected.

Figure 17:
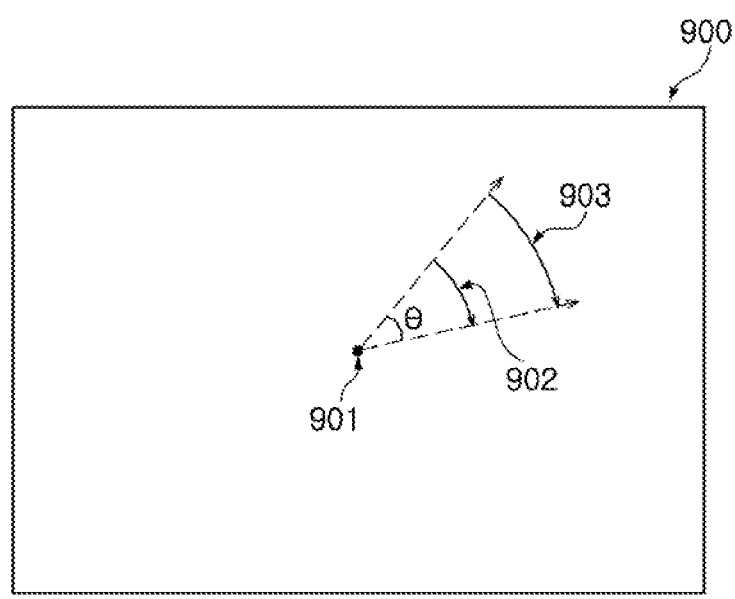
FIG. 17 illustrates the operation of an image sensor according to an exemplary embodiment of the present inventive concept.

FIG. 17 illustrates operations of an image sensor according to an exemplary embodiment of the present inventive concept.

Referring to FIG. 17, according to an embodiment, values that correspond to the third axis (axis Z) in the compensation information represent a rotational motion component about a center point 901 of an image 900. For example, if a third axis value of the compensation information has a positive sign, the rotational motion is assumed to have occurred in a clockwise direction, whereas if the third axis value has a negative sign, the rotational motion is assumed to have occurred in a counter-clockwise direction. Alternatively, in another exemplary embodiment, the sign of a third axis value and the direction of a rotational motion may be paired together the other way around.

As illustrated in FIG. 17, according to an embodiment, depending on the distance from an individual pixel in the image 900 to the center point 901, a change in pixel coordinates due to a rotation quantity θ, which corresponds to a third axis value, may vary. For the rotation quantity θ, changes coordinates 902 of pixels relatively close to the center point 901 are smaller than changes in coordinates 903 of pixels that are relatively far from the center point 901.

In one exemplary embodiment, first, x-axis values and second, y-axis values recorded in the compensation information represent how much an electronic device in which the image sensor is installed has moved along the respective axes while capturing the image 900. For example, the compensation information expresses motion of the electronic device in which the image sensor installed, in units of angles or pixels.

According to an embodiment, first axis and second axis movement quantities recorded in the compensation information can be identical for pixels in the image 900. However, the third axis value, which represents a rotation quantity θ can vary depending on the distance from an individual pixel to the center point of the image 900. This is because a displacement distance due to the rotation quantity θ changes as a function of the distance from an individual pixel to the center point of the image 900. Accordingly, for example, even with the same rotation quantity θ, third axis values of pixels relatively close to the center point of the image 900 are less than third axis values of pixels relatively far from the center of the image 900.

In one exemplary embodiment, third axis values are reflected in first axis values and second axis values in the compensation information. Thus, the calculated first axis values and second axis values can vary depending on the locations of the respective pixels in the image 900. Accordingly, as a rotational motion is taken into account, along with translational motions occurring in the first axis direction and the second axis direction, it is possible to accurately generate compensation information that represents motion of an electronic device in which the image sensor is installed.

Figure 18:
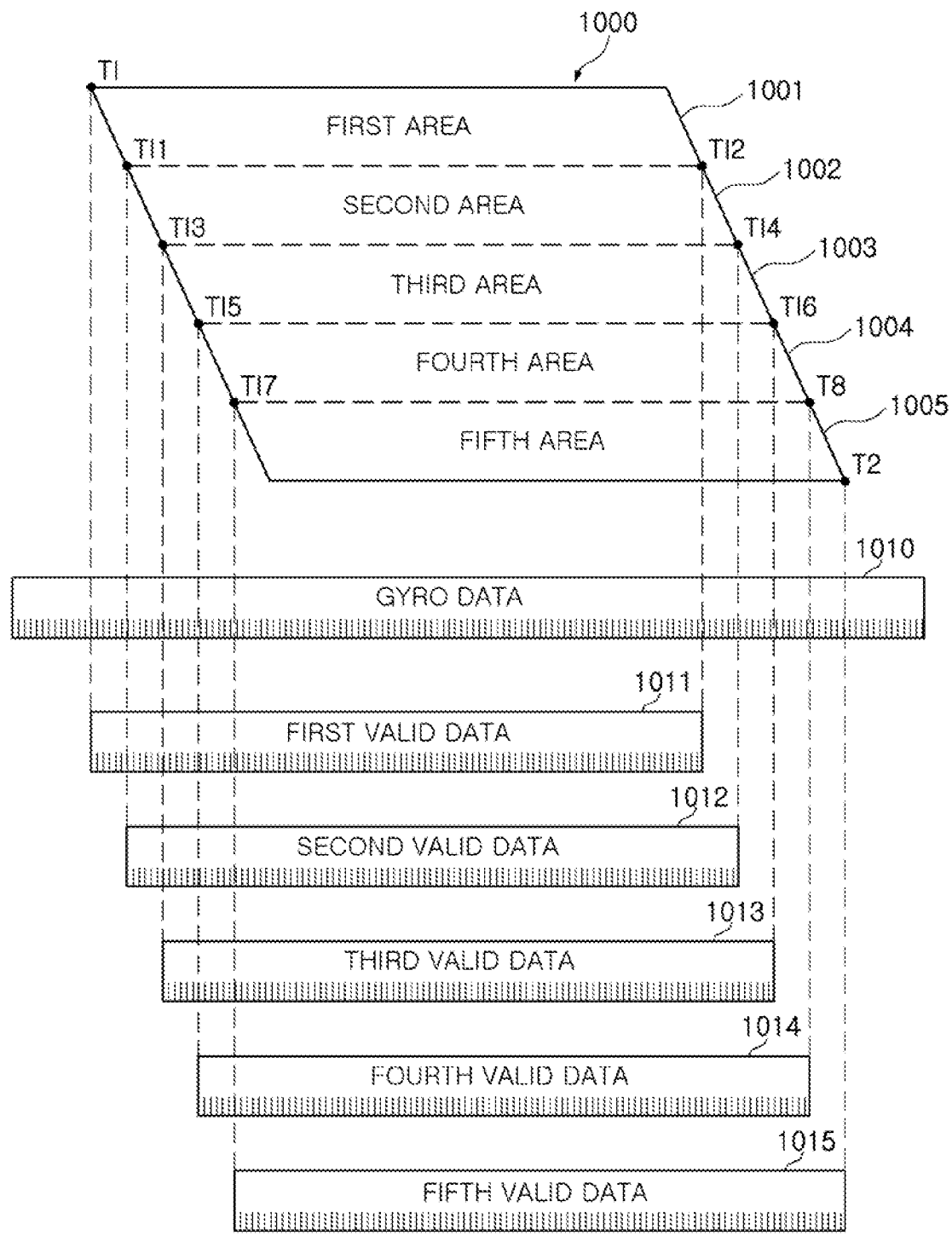
FIG. 18 illustrates the operation of an image sensor according to an exemplary embodiment of the present inventive concept.

FIG. 18 illustrates operations of an image sensor according to an exemplary embodiment of the present inventive concept.

Referring to FIG. 18, according to an embodiment, the image sensor divides mage data 1000 that corresponds to a single image frame into a plurality of areas 1001-1005, and from gyro data 1010 generates valid data 1011-1015 that corresponds to the areas 1001-1005, respectively. The image sensor selects from the gyro data 1010 sampled data items that correspond to exposure periods of the areas 1001-1005, respectively, and generates valid data 1011-1015 that corresponds to areas 1001-1005, respectively. In an exemplary embodiment illustrated in FIG. 18, the image sensor is illustrated dividing the image data 1000 into five areas 1001-1005, but embodiments are not necessarily limited thereto, and there can be more or fewer areas in other embodiments.

According to an embodiment, the image sensor defines a plurality of intermediate time points TI1-TI8 within a time period between a start time point T1 of an exposure period within which a shutter operation is executed to an end time point T2 of the exposure period. The intermediate time points TI1-TI8 define exposure periods of the first to five areas 1-5, respectively. For example, pixels contained in a first area 1001 are exposed by a shutter operation executed between the time point T1 and the intermediate time point TI2. The exposure period for pixels contained in a second area 1002 start at a first intermediate time point TI1 and end at a fourth intermediate time point TI4.

According to an embodiment, the gyro data 1010 is output by a gyro sensor installed in an electronic device that includes the image sensor upon sensing motion of the electronic device, and the gyro data 1010 contains a plurality of sampling data. The image sensor selects, from the gyro data 1010, sampling data generated by the gyro sensor between the time points that define the exposure periods of the first to fifth areas 1001-1005, and generates therefrom first to fifth valid data 1011-1015 that correspond to the first to fifth areas 1001-1005, respectively. As illustrated in FIG. 18, at least a portion of the first to fifth valid data 1011-1015 shares some of the sampling data in common.

According to an embodiment, the image sensor generates compensation information that corresponds to the first to fifth areas 1001-1005, respectively, by using the sampling data contained in the first to fifth valid data 1011-1015, respectively. An image correction process that uses the compensation information items can be executed by an external processor connected to the image sensor. Alternatively, in other exemplary embodiments, the image sensor directly executes an image correction process.

Figure 19:
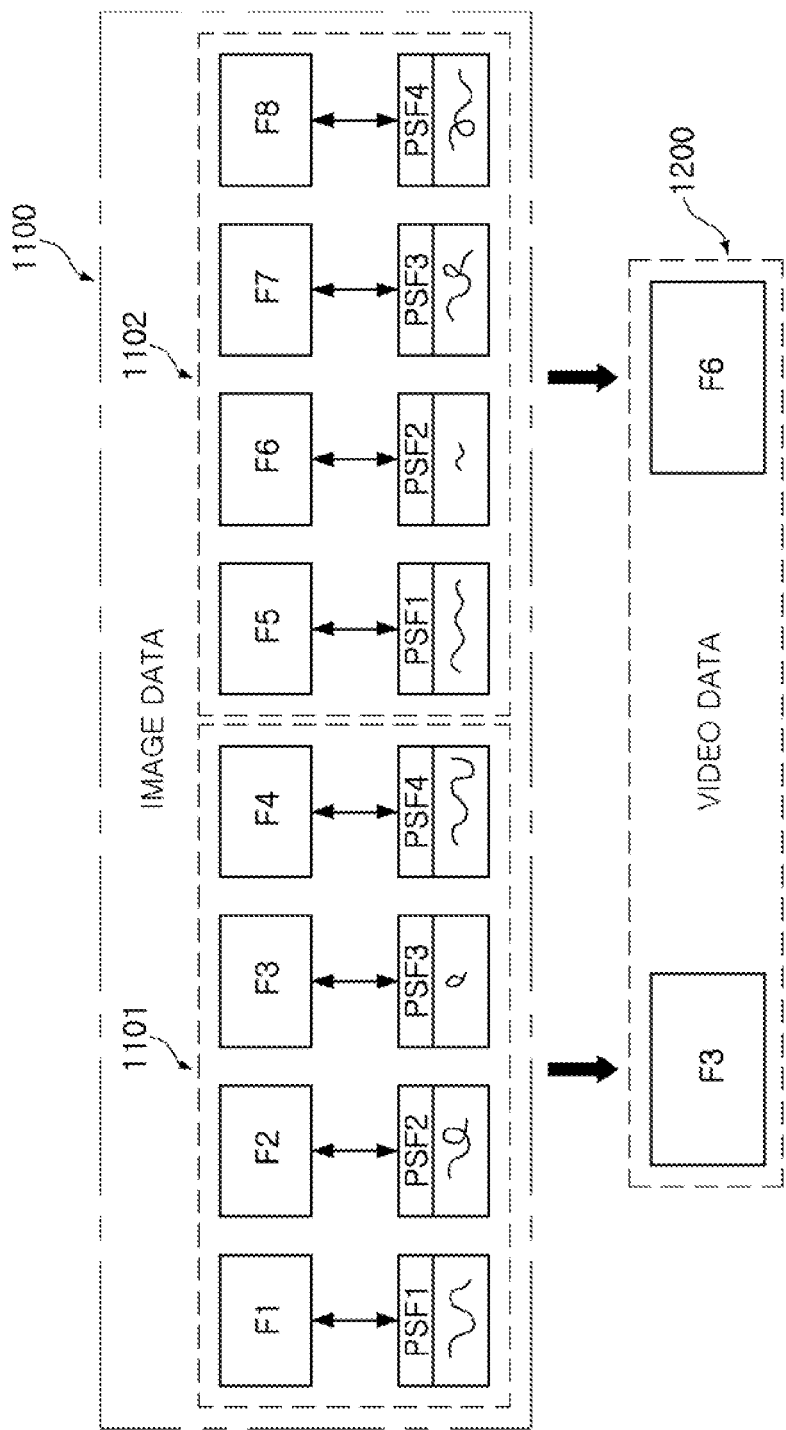
FIG. 19 and FIG. 20 illustrate operations of an image sensor according to an exemplary embodiment of the present inventive concept.
Figure 20:
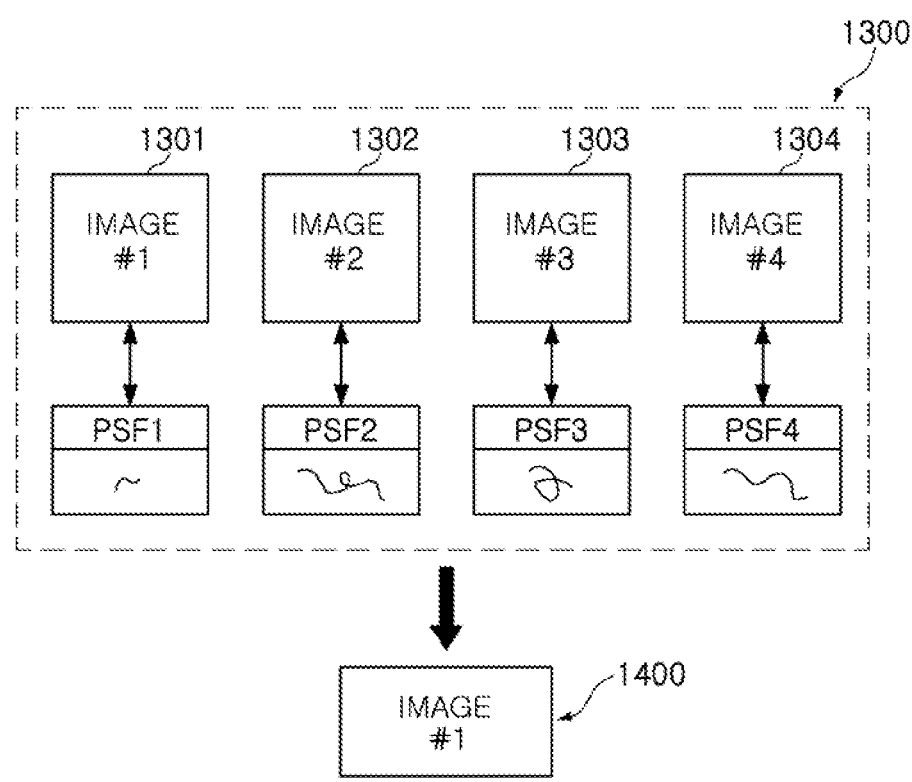

FIG. 19 and FIG. 20 illustrate operations of an image sensor according to an exemplary embodiment of the present inventive concept.

First, referring to FIG. 19, according to an embodiment, the image sensor generates image data 1100 at a predetermined frame rate in response to a command received from a user, and outputs video data 1200. The image sensor generates the image data 1100 at a first frame rate, and outputs the video data 1200 at a second frame rate that is lower than the first frame rate.

According to an embodiment, the image sensor, based on a difference between the first frame rate and the second frame rate, divides image frames F1-F8 in the image data 1100 into a plurality of groups 1101 and 1102. The image sensor groups the image frames F1-F8 into the groups 1101 and 1102 according to a ratio of the first frame rate to the second frame rate. In an exemplary embodiment illustrated in FIG. 19, the first frame rate is four times the second frame rate, and each four adjacent image frames of the image frames F1-F8 are grouped into the groups 1101 and 1102, respectively. For example, the first frame rate is 120 Hz while the second frame rate is 30 Hz. When the first frame rate is 240 Hz and the second frame rate is 30 Hz, eight adjacent image frames of the image frames F1-F8 are grouped into a single group.

According to an embodiment, the image sensor selects an image frame that has the least amount of motion from each of the groups 1101 and 1102, and outputs the same as a result image. The image sensor generates compensation information items PSF1-PSF8 that represent blur in the image frames F1-F8, respectively, and based on the compensation information items PSF1-PSF8, determines a degree to which blur has occurred when capturing the respective image frames F1-F8. In an exemplary embodiment illustrated in FIG. 19, the image sensor selects a third image frame F3 from a first group 1101 as a result image, and selects a sixth image frame F6 front a second group 1102 as a result image, to generate the video data 1200.

According to an embodiment, due to a limited capacity of a memory installed in the image sensor, the image sensor may not store all image frames contained in the groups 1101 and 1102. In this case, if an image frame being currently exposed is determined from a compensation information item as having a relatively small amount of motion, the image sensor outputs the corresponding image frame. If the image frame is determined as having a relatively excessive amount of motion, then the image sensor will generate a subsequent image frame. In one exemplary embodiment, the image sensor compares a compensation information item calculated from a current image frame to a predetermined reference value, and if the compensation information item is less than the reference value, the image sensor outputs the current image frame; and if the compensation information item is greater than the reference value, the image sensor deletes the current image frame and generates a subsequent image frame.

For example, according to an embodiment, in the first group 1101, if the size of blur that occurs while capturing a first image frame F1 was relatively large, the image sensor can delete the first image frame F1 and generate a second image frame F2. If the size of blur that occurs while capturing the second image frame F2 was again relatively large, the image sensor again deletes the second image frame F2 and captures a third image frame F3. If the size of blur that occurs while capturing the third image frame F3 was relatively small, the image sensor stores the third image frame F3 and does not generate a fourth image frame F4. For example, if it is determined that the size of blur that occurs in every image frame before capturing the last image frame was relatively large, the last image frame, regardless of the blur size therein, is stored in memory. This process described above can be applied to generating a still image as well as to generating the video data 1200.

Next, an exemplary embodiment illustrated in FIG. 20 corresponds to an operation 1300 of outputting a still image. Referring to FIG. 20, in an operation 1300 of outputting a single still image, the image sensor generates a plurality of candidate images 1301-1304. The image sensor generates compensation information items PSF1-PSF4 that respectively represent blur in the candidate images 1301-1304, and refers to the compensation information items PSF1-PSF4 and outputs a single candidate image that has the least amount of motion as result image 1400. In an exemplary embodiment illustrated in FIG. 20, a first candidate image 1301 is determined as the result image 1400.

Figure 21:
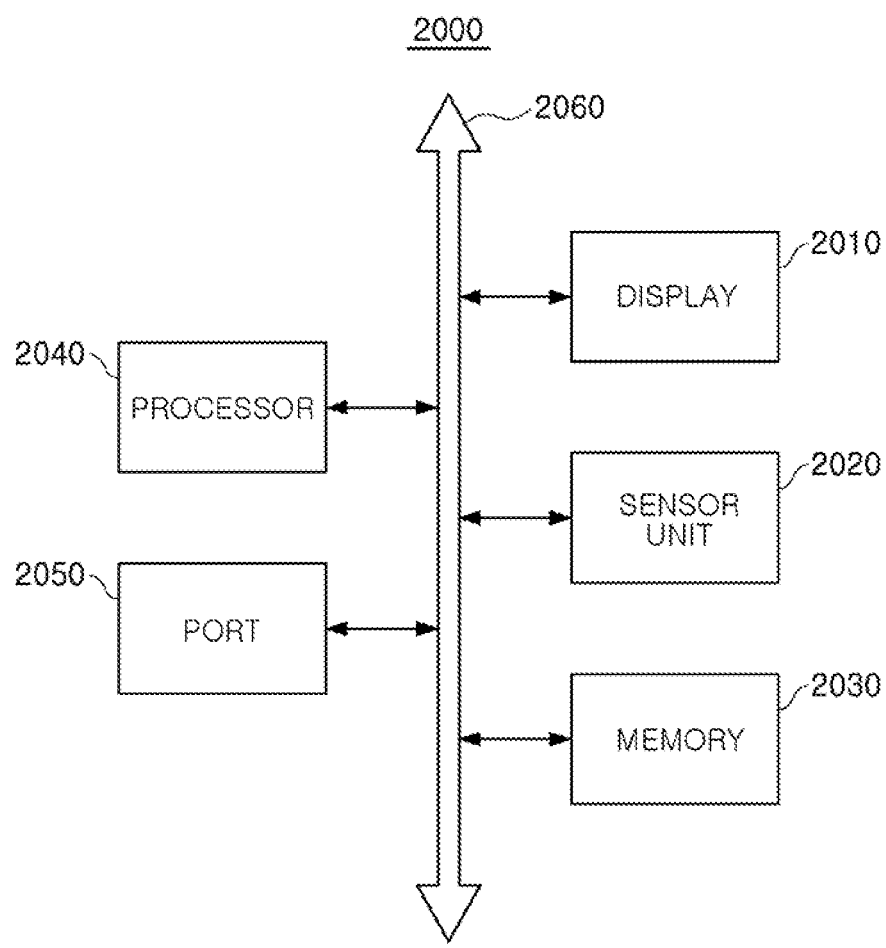
FIG. 21 is a simplified block diagram of an electronic device including an image sensor according to an exemplary embodiment of the present inventive concept.

FIG. 21 is a simplified block diagram of an electronic device that includes an image sensor according to an exemplary embodiment of the present inventive concept.

A computer apparatus 2000 according to an exemplary embodiment illustrated in FIG. 21 includes a display 2010, a sensor unit 2020, a memory device 2030, a processor 2040, a port 2050, etc, connected to each other via a bus 2060. The computer apparatus 2000 further includes wired/wireless communication devices, electric power supply devices, etc.

Among the components illustrated in FIG. 21, port 2050 is provided to allow the computer apparatus 2000 to communicate with a video card, a sound card, a memory card, a USB device, etc. Examples of the computer apparatus 2000 include a smartphone, a tablet PC, a smart wearable device, etc., as well as a desktop computer or a laptop computer.

According to an embodiment, a processor 2040 executes a particular operation, command, or task, etc. The processor 2040 may be a central processing unit (CPU), a microprocessor unit (MCU), or a system-on-chip (SoC), etc., and through the bus 2060, can communicate with the display 2010, the sensor unit 2020, and the memory device 2030, as well as with other devices connected to the port 2050.

According to an embodiment, the memory device 2030 can store multimedia data or data used for the operation of the computer apparatus 2000, etc. The memory device 2030 may include volatile memory such as a random access memory (RAM), or non-volatile memory such as a flash memory. In addition, the memory 2030 may include, as a storage device, at least one of a solid-state drive (SSD), a hard disk drive (HDD), or an optical drive (ODD).

According to an embodiment, the sensor unit 2020 includes sensors such as an image sensor, a gyro sensor, or a temperature sensor, etc. The image sensor and the gyro sensor are connected to the processor 2040 by the bus 2060 or other communication means. The image sensor and the gyro sensor are connected to exchange data directly with each other without going through the processor 2040. The image sensor is used in the computer apparatus 2000 in various forms according to exemplary embodiments described with reference to FIG. 1 to FIG. 20.

According to exemplary embodiments of the present inventive concept, an image sensor includes an interface directly connected to a gyro sensor, and the image sensor and the gyro sensor are synchronized with each other. From gyro data output by the gyro sensor in response to motion sensed thereby, the image sensor can extract valid data that corresponds to an exposure period of the image sensor and can generate compensation information that corrects motion-related image degradations. Accordingly, without further using an additional module, performance of the image sensor can be improved by effectively correcting motion-related image degradations.

However, various effects of embodiments of the present inventive concept are not limited to the foregoing contents, and may be more clearly understood throughout the detailed exemplary embodiments.

While exemplary embodiments have been shown and described above, it will be apparent to those skilled in the art that modifications and variations could be made without departing from the spirit and scope of embodiments of the present inventive concept as defined by the appended claims.

What is claimed is:

1. An image sensor, comprising:
a pixel array that includes a plurality of pixels;
a first interface directly connected to an external gyro sensor and that receives gyro data output by the gyro sensor in response to a motion; and
a control logic that generates image data by exposing the plurality of pixels for a predetermined exposure period, generates valid data that corresponds to the exposure period using the gyro data, and generates, based on the valid data, compensation information that represents a movement path of the motion,
wherein the gyro data contains a plurality of sampling data generated at a predetermined sampling rate, and the control logic compares timestamps that represent a start time point and an end time point of the exposure period, respectively, to timestamps of the plurality of sampling data, wherein the valid data is determined from the plurality of sampling data.

2. The image sensor of claim 1, wherein the compensation information contains a point spread function that represents the movement path of the motion.

3. The image sensor of claim 1, wherein
the pixel array includes a plurality of row lines and a plurality of column lines that are connected to the plurality of pixels, and
the control logic determines as the valid data the gyro data obtained between a start time point of a scan period for a first row line of the plurality of row lines and an end time point of a scan period for a last row line of the plurality of row lines.

4. The image sensor of claim 1,
wherein the control logic divides the exposure period into a plurality of time intervals and integrates the valid data within the respective time intervals,
wherein the compensation information is generated.

5. The image sensor of claim 1, wherein the control logic generates the compensation information by integrating the valid data within the exposure period.

6. The image sensor of claim 1, wherein the control logic
compares the compensation information of the image data generated in response to a command received from a user to a predetermined reference value, and
outputs the image data as a result image when the compensation information is less than the reference value, and
deletes the image data and generates new image data when the compensation information is greater than the reference value.

7. The image sensor of claim 1, wherein
the image data includes a plurality of image data frames, and
the plurality of image data frames have a first frame rate, and
the control logic outputs video data at a second frame rate lower than the first frame rate.

8. The image sensor of claim 7, wherein the control logic
divides the plurality of image data frames into a plurality of groups, based on a difference between the first frame rate and the second frame rate,
selects from each of the plurality of groups an image data frame having a least amount of the motion calculated from the compensation information, and
outputs the selected image data frame as the video data.

9. The image sensor of claim 8, wherein the control logic
divides the plurality of image data frames into a plurality of groups, based on a difference between the first frame rate and the second frame rate,
compares the compensation information of the plurality of image data frames being sequentially generated from the respective groups to a predetermined reference value, and
determines whether to output the plurality of image data frames as the video data.

10. The image sensor of claim 1, wherein the compensation information contains coordinate information that represents a movement path that corresponds to the motion.

11. The image sensor of claim 10, wherein the coordinate information includes
information of a first axis, information of a second axis that is perpendicular to the first axis, and information of a third axis that corresponding to rotation information about a center of the image data.

12. The image sensor of claim 1, wherein the image sensor is operated as a master device with respect to the gyro sensor connected to the first interface.

13. The image sensor claim 1, wherein the control logic divides the image data into a plurality of areas, and extracts from the gyro data the valid data that corresponds to an exposure period for each of the plurality of areas.

14. An electronic device, comprising:
a gyro sensor that detects a motion that has an arbitrary movement path and outputs sampling data at a predetermined sampling rate;
an image sensor that includes a plurality of pixels and
a control logic that generates image data based on pixel signals output by the plurality of pixels, wherein the control logic outputs compensation information that corresponds to the movement path of the motion based on the sampling data generated by the gyro sensor within an exposure period of the plurality of pixels; and
a processor that generates a result image from the image data, based on the compensation information,
wherein the control logic
compares the compensation information of the image data generated in response to a command received from a user to a predetermined reference value, and
outputs the image data as a result image when the compensation information is less than the reference value, and
deletes the image data and generates new image data when the compensation information is greater than the reference value.

15. The electronic device of claim 14, wherein the gyro sensor includes a first interface connected to the image sensor and a second interface connected to the processor.

16. The electronic device of claim 14, wherein the sampling rate of the gyro sensor is higher than a frame rate of the image sensor.

17. The electronic device of claim 14, wherein the processor generates the result image by correcting blur present in the image data due to the motion by using the compensation information.

18. The electronic device of claim 14, wherein
the image data contains a plurality of image data frames, and
the processor selects as a result image an image data frame from the plurality of image data frames that has a least amount of the motion.

19. An image sensor, comprising:
a pixel array that includes a plurality of pixels connected to a plurality of row lines and a plurality of column lines;
a row driver that sequentially scans the plurality of row lines within a predetermined exposure period;
a readout circuit connected to the plurality of column lines and that detects pixel voltages of the plurality of pixels; and
a control logic that
controls operation timings of the row driver and the readout circuit,
integrates sampling data included in a gyro data received from an external gyro sensor within the exposure period, and
generates compensation information that represents a movement path of a motion sensed by the gyro sensor,
wherein the control logic compares timestamps that represent a start time point and an end time point of the exposure period, respectively, to timestamps of the sampling data, to determine valid data corresponding to the exposure period, from the sampling data, and
the control logic generates the compensation information based on the valid data.

* * * * *